United States Patent
Banerjea

(10) Patent No.: US 8,315,564 B2
(45) Date of Patent: Nov. 20, 2012

(54) SHORT-RANGE WIRELESS COMMUNICATION

(75) Inventor: Raja Banerjea, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 638 days.

(21) Appl. No.: 12/478,446

(22) Filed: Jun. 4, 2009

(65) Prior Publication Data

US 2009/0311961 A1    Dec. 17, 2009

Related U.S. Application Data

(60) Provisional application No. 61/061,977, filed on Jun. 16, 2008, provisional application No. 61/079,635, filed on Jul. 10, 2008.

(51) Int. Cl.
*H04B 7/00* (2006.01)

(52) U.S. Cl. ......... 455/41.2; 455/453; 455/522; 455/24; 455/69; 455/126; 455/115.1; 455/67.11; 455/13.4

(58) Field of Classification Search .................. 455/41.2, 455/522, 24, 453; 370/335, 437, 338
See application file for complete search history.

(56) References Cited

U.S. PATENT DOCUMENTS

| | | | |
|---|---|---|---|
| 4,805,215 A | 2/1989 | Miller | |
| 5,708,656 A * | 1/1998 | Noneman et al. | 370/335 |
| 6,347,091 B1 * | 2/2002 | Wallentin et al. | 370/437 |
| 6,366,622 B1 | 4/2002 | Brown et al. | |
| 6,374,117 B1 * | 4/2002 | Denkert et al. | 455/522 |
| 6,519,461 B1 * | 2/2003 | Andersson et al. | 455/453 |
| 6,553,229 B1 | 4/2003 | Dent | |
| 6,640,308 B1 | 10/2003 | Keyghobad et al. | |
| 6,675,328 B1 | 1/2004 | Krishnamachari et al. | |
| 6,934,566 B2 | 8/2005 | Kang et al. | |
| 6,954,708 B2 | 10/2005 | Rakshani et al. | |
| 7,079,811 B2 | 7/2006 | Lee et al. | |
| 7,173,431 B1 | 2/2007 | Lo et al. | |
| 7,206,840 B2 * | 4/2007 | Choi et al. | 709/225 |
| 7,257,095 B2 | 8/2007 | Liu | |
| 7,355,416 B1 | 4/2008 | Darshan | |
| 7,377,441 B2 | 5/2008 | Wiklof et al. | |
| 7,403,018 B1 | 7/2008 | Lo et al. | |
| 7,826,411 B2 | 11/2010 | Gonikberg et al. | |
| 7,849,333 B2 | 12/2010 | Schindler | |
| 7,881,746 B2 | 2/2011 | Desai | |
| 7,995,544 B2 * | 8/2011 | Benveniste | 370/338 |
| 8,275,314 B1 | 9/2012 | Lin et al. | |
| 2004/0063403 A1 | 4/2004 | Durrant | |
| 2004/0110470 A1 * | 6/2004 | Tsien et al. | 455/24 |

(Continued)

FOREIGN PATENT DOCUMENTS

CN  102067689   5/2011

(Continued)

OTHER PUBLICATIONS

"PCT Search Report", Application No. PCT/US2009/046289, (Oct. 29, 2009), 13 pages.

(Continued)

Primary Examiner — Matthew Anderson
Assistant Examiner — Ganiyu A Hanidu

(57) ABSTRACT

The present specification describes techniques and apparatus that enable wireless devices to communicate effectively at short ranges. In one implementation, the transmit power of a transmitting device is reduced to permit a receiving device to demodulate a signal.

19 Claims, 6 Drawing Sheets

U.S. PATENT DOCUMENTS

| | | | |
|---|---|---|---|
| 2006/0063509 A1 | 3/2006 | Pincu et al. | |
| 2006/0128308 A1 | 6/2006 | Michael et al. | |
| 2006/0239443 A1 | 10/2006 | Oxford et al. | |
| 2007/0081553 A1 | 4/2007 | Cicchetti et al. | |
| 2007/0103829 A1 | 5/2007 | Darshan et al. | |
| 2007/0280471 A1 | 12/2007 | Fallahi et al. | |
| 2008/0027033 A1 | 1/2008 | Gonda et al. | |
| 2008/0076466 A1* | 3/2008 | Larsson | 455/522 |
| 2008/0129118 A1 | 6/2008 | Diab | |
| 2008/0310067 A1 | 12/2008 | Diab et al. | |
| 2009/0005061 A1 | 1/2009 | Ward et al. | |
| 2009/0168725 A1 | 7/2009 | Mishra | |
| 2009/0291640 A1 | 11/2009 | Bhattad et al. | |
| 2010/0216497 A1 | 8/2010 | Kawasaki | |
| 2010/0248734 A1 | 9/2010 | Yamazaki et al. | |

FOREIGN PATENT DOCUMENTS

| | | |
|---|---|---|
| WO | WO-0178252 | 10/2001 |
| WO | 02/091623 A | 11/2002 |
| WO | WO-02091623 | 11/2002 |

OTHER PUBLICATIONS

Jung, Eun-Sun et al., "A Power Control MAC Protocolfor Ad Hoc Networks", *Wireless Networks; The Journal of Mobile Communication, Computation, and Information*, vol. 11, No. 1-2, Kluwer Academic Publishers,(Jan. 1, 2005), pp. 55-66.

"Information Technology—Telecommunications and Information Exchange Between systems—Local and Metropolitan Area Networks—Specific Requirements", *IEEE Standard* (Aug. 1, 2005), pp. 1-60.

"Foreign Office Action", EP Application No. 09789754.0, (May 17, 2011), 8 pages.

"Information Technology—Telecommunications and Information Exchange Systems—Local and Metropolitan Area Networks—Specific Requirements", *Part 11: Wireless Lan Medium Access Control (MAC) and Physical Layer (PHY) between Specifications*, IEEE Standard 802.11h-2003 (Amendment to IEEE Standard 802.111993),(Oct. 14, 2003), 80 pages.

"Non-Final Office Action", U.S. Appl. No. 12/190,251, (Mar. 29, 2011), 8 pages.

Sascha Oppenberg; Written Opinion of the International Searching Authority; Patent Cooperation Treaty; Oct. 29, 2009; International application No. PCT/US2009/046289.

Eun-Sun Jung et al: "A Power Control MAC Protocol for Ad Hoc Networks" Wireless Networks; The Journal of Mobile Communication, Computation and Information, Kluwer Academic Publishers, DO, vol. 11, No. 1-2, Jan. 1, 2005, pp. 55-66, XP019216725 ISSN: 1572-8196.

Anonymous Ed—Anonymous: "Information technology, Telecommunications and information exchange between systems, Local and metropolitan area networks, Specific requirements, Part 11: Wireless Medium Access Control (MAC) and Physical Layer (PHY) specifications Amendment 5: Spectrum and transmit power management extensions in the 5 GHz" IEEE Standard; [IEEE Standard], IEEE, Piscataway, NJ, USA, Jan. 1, 2006, pp. c1-c60, XP017601558 ISBN: 978-0-7381-3818-3.

"Final Office Action", U.S. Appl. No. 12/190,251, (Sep. 13, 2011), 15 pages.

"Non-Final Office Action", U.S. Appl. No. 12/534,361, (Oct. 12, 2011), 11 pages.

"Part 11: Wireless LAN Medium Access Control (MAC) and Physical Layer (PHY) specifications", *Information technology—Telecommunications and information exchange between systems—Local and metropolitan area networks—Specific requirements—*, IEEE,(Aug. 20, 1999).

"Advisory Action", U.S. Appl. No. 12/190,251, Dec. 7, 2011, 3 pages.

"Final Office Action", U.S. Appl. No. 12/534,361, Feb. 29, 2012, 13 pages.

"Non-Final Office Action", U.S. Appl. No. 12/323,292, Dec. 21, 2011, 17 pages.

"Non-Final Office Action", U.S. Appl. No. 12/190,240, Jan. 6, 2012, 7 pages.

"Non-Final Office Action", U.S. Appl. No. 12/190,251, (Mar. 29, 2012), 11 pages.

"Notice of Allowance", U.S. Appl. No. 12/190,240, (May 16, 2012), 4 pages.

"Final Office Action", U.S. Appl. No. 12/323,292, Aug. 24, 2012, 26 pages.

"Foreign Office Action", European Patent Application No. 09789754.0, Jul. 12, 2012, 4 pages.

\* cited by examiner

SHORT-RANGE WIRELESS COMMUNICATION

RELATED APPLICATIONS

This application claims priority to U.S. Provisional Patent Application Ser. No. 61/061,977 filed Jun. 16, 2008, the disclosure of which is incorporated by reference herein in its entirety and claims priority to U.S. Provisional Patent Application Ser. No. 61/079,635 filed Jul. 10, 2008, the disclosure of which is incorporated by reference herein in its entirety.

BACKGROUND

Devices that communicate wirelessly often do not communicate effectively at short range—e.g., a range less than 1 meter. A user wishing to sink a cellular phone with a laptop computer, for example, may find that neither communicates effectively—or in some cases at all—when the devices are close to each other.

SUMMARY

A method is described for transmitting, through a network, a link-setup request for a device to transmit at a lower-than-nominal power; receiving, through the network and from the device, a link-setup response indicating a current transmit power of the device, the link-setup response having been received at a received power; determining, based on the received power of the link-setup response, a desired data-signal transmit power for the device; and transmitting, through the network, the desired data-signal transmit power to the device.

Another method is described for transmitting, from a first wireless-communication-capable device, a first signal at a first power and first modulation, the first signal indicating a request to use a transmission medium for a duration of time; and responsive to receiving a response indicating that the transmission medium is free to use for the duration of time or not receiving a response for a period sufficient to indicate that no potentially interfering device received the first signal, transmitting, from the first wireless-transmission-capable device, a second signal at a second power, a second modulation, and for less than or equal to the duration of time, the second signal transmitting data to a second wireless-communication-capable device, the second power being a lower power than the first power, and the second modulation being different than the first modulation.

A system on chip (SoC) is also described, the SoC configured to receive a link-setup request, the like-setup request requesting transmission of a data signal at a lower-than-nominal power; transmit a link-setup response in response to receiving the link-setup request, the link-setup response indicating a current transmit power; receive a desired data-signal transmit power in response to the link-setup response; transmit a request to use a transmission medium for a duration of time; and transmit, responsive to receiving an indication that the transmission medium is free to use for the duration of time or not receiving an indication for a period sufficient to indicate that no potentially interfering device received the request to use the transmission medium for the duration of time, the data signal at the desired data-signal transmit power for less than or equal to the duration of time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

As noted in the Background above, devices that communicate wirelessly often fail to communicate effectively at short range. At short range, a signal receiver in a device may be incapable of demodulating a strong wireless signal. For current wireless LAN communication protocols, such as IEEE 802.11, the range at which communication becomes less effective is at about one meter or closer. At even shorter ranges, such as 0.2 meter or less, many devices following this or other communication protocols may not be able to communicate at all.

The present specification describes techniques and apparatus that enable wireless devices to communicate effectively at short ranges. In one implementation, the transmit power of a transmitting device is reduced to permit a receiving device to demodulate a signal.

In some cases a first device transmitting signals at lower power to a second device, however, can cause a third device to be unaware of the transmission between the first device and the second device. Such a situation is referred to herein as a "lost node"—e.g., when a third device (a node) is unaware of another device (the "lost node"), the third device may transmit a signal even if the lost node is also transmitting. The third device may transmit because it is not aware that other devices are using the same transmission medium. This transmission by the third device may interfere with the receiver of the receiving device or simply obscure the transmission of the "lost node". To address this potential problem as well as for other positive effects, the present specification also describes techniques and apparatus that enable a device to determine that a low-power transmission is being or will be made. By so doing, devices can communicate effectively at short range without interference from other devices.

In the discussion that follows, an example operating environment is described. Example methods are also described that may be employed in the example operating environment as well as other environments. These methods are followed by an example System-on-Chip (SoC) embodiment in which components of FIG. 1 may be embodied. In the discussion below, reference will be made to the environment by way of example only and, therefore, implementations described below are not limited to the example environment.

Example Operating Environment

Figure 1:
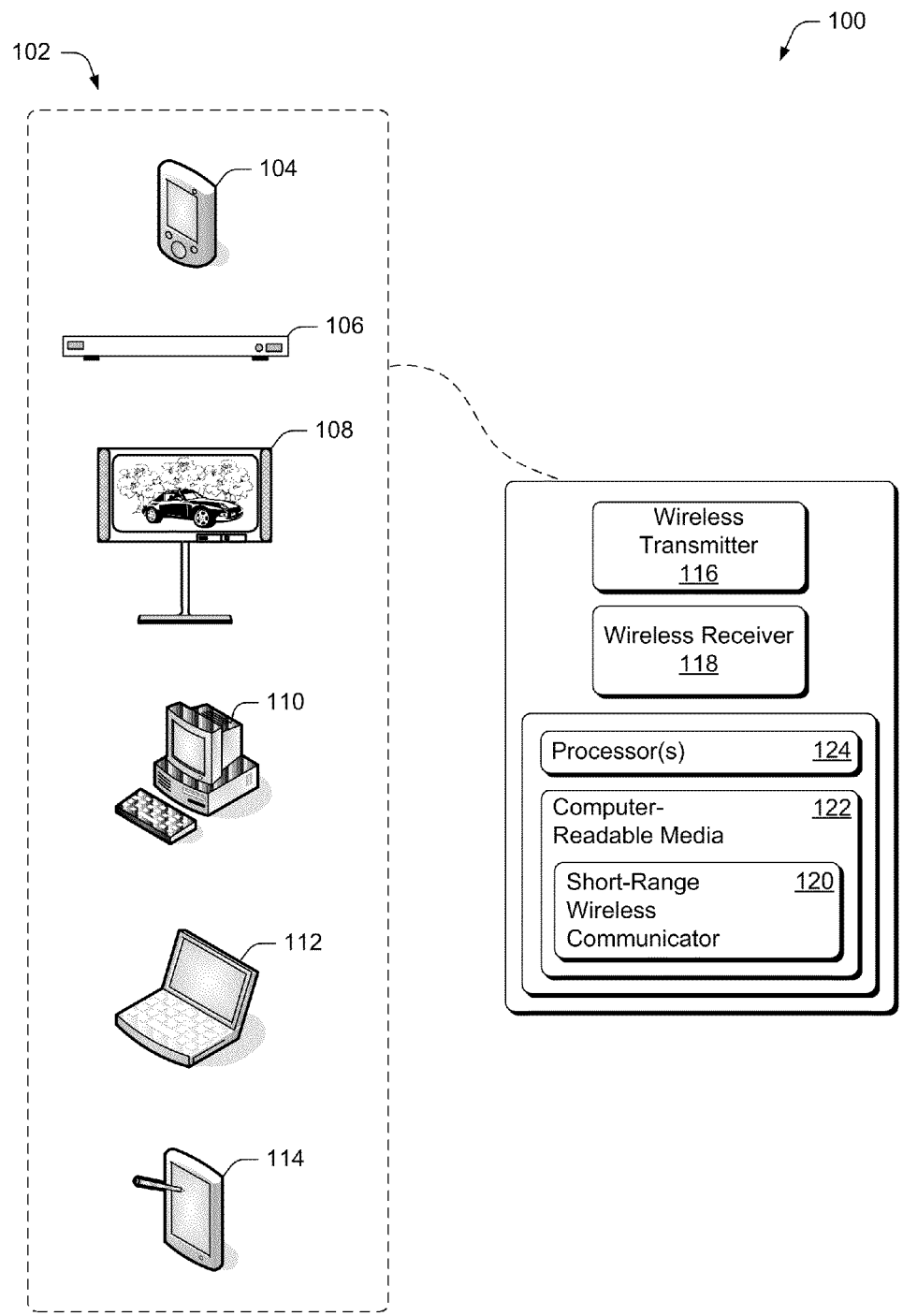
FIG. 1 is an illustration of an example operating environment that is configured to enable short-range wireless communication.

FIG. 1 illustrates an example operating environment 100. The example operating environment 100 includes wirelesscommunication-capable devices 102, all of which are capable of transmitting and receiving wireless communications, such as those following wireless LAN or Bluetooth communication protocols. Devices 102 are shown to include a cellular phone 104, a set-top box 106, a television computing device 108, a desktop computing device 110, a laptop computing device 112, and a handheld tablet computer 114.

In this example environment, each of devices 102 includes a wireless transmitter 116, a wireless receiver 118, and a short-range wireless communicator 120. Wireless transmitter 116 is capable of transmitting a wireless-communication signal according to one or more communication protocols, such as those for a wireless LAN (Local Area Network) or a wireless PAN (Personal Area Network). These protocols may include those of the IEEE 802.11 and Bluetooth families of protocols.

Wireless receiver 118 is capable of receiving a wireless-communication signal according to one or more communication protocols, such as those noted for wireless transmitter 116. Wireless transmitter 116 and wireless receiver 118 may be separate (shown) or combined (often called a transceiver, not shown) and may be hardware combined with or separate from software. Wireless transmitter 116 and wireless receiver 118 are capable of modulating and demodulating a wireless signal, respectively.

Figure 2:
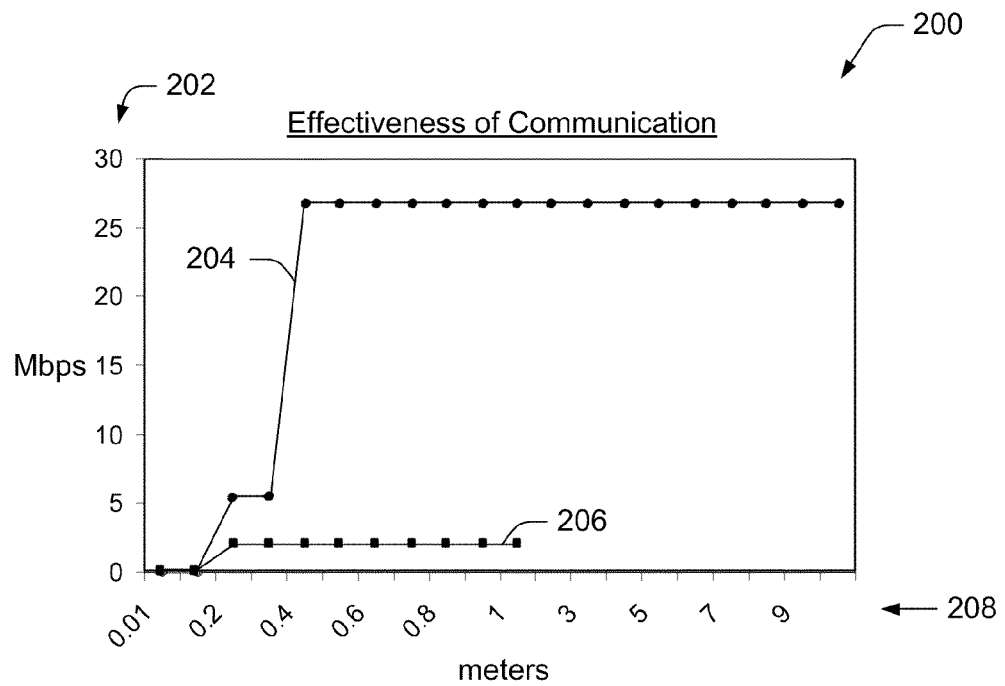
FIG. 2 is a graph showing example communication effectiveness relative to proximity between wireless-communication devices.

Note that these various wireless-communication protocols may enable communication less effectively at short ranges, such as those of less than one meter. Even receivers that are relatively capable of handling high-power transmissions (and thus typical short-range transmissions) are often susceptible to some loss of effectiveness at short range. Consider graph 200 of FIG. 2, which shows example communication effectiveness relative to proximity between wireless-communication devices. Graph 200 shows example communication effectiveness for current wireless LAN communication protocols of 802.11 and Bluetooth for some devices. Here the effectiveness of communication drops at about 0.4 meter for 802.11 and 0.25 meter for Bluetooth. Effectiveness of communication is shown as throughput in megabytes per second at 202, effectiveness for 802.11 is shown relative to meters proximity at 204, effectiveness for Bluetooth is shown relative to meters proximity at 206, with proximity in meters (not to scale) shown at 208.

Short-range wireless communicator 120 (also referred to as "communicator 120" for brevity) is capable of enabling a wireless device to communicate effectively at short range. Communicator 120 may act independently or in conjunction with various other entities, such as wireless transmitter 116 and wireless receiver 118. Communicator 120 may be separate from or integral with other entities of device 102 as well, such as by being firmware integrated into a System-on-Chip (SoC) having or communicating with wireless transmitter 116 and wireless receiver 118.

In environment 100 of FIG. 1, communicator 120 includes a set of computer-executable instructions stored on computer-readable media 122. When executed by one or more processors 124, device 102 acts according to those instructions.

Communicator 120 is capable of making decisions and performing one or more tasks to enable devices to effectively communicate wirelessly at short range. In some embodiments this also includes addressing a "lost-node" separately from or in conjunction with lowering transmission power as described below in the sections entitled "Example Power-control Process" and "Lost Node", as well as elsewhere herein.

Example Power-Control Process

The following discussion describes techniques that may be implemented utilizing the previously described environment. Aspects of the method may be implemented in hardware, firmware, software, or a combination thereof. The methods are shown as a set of blocks that specify operations performed by one or more entities and are not necessarily limited to the orders shown for performing the operations by the respective blocks.

Figure 3:
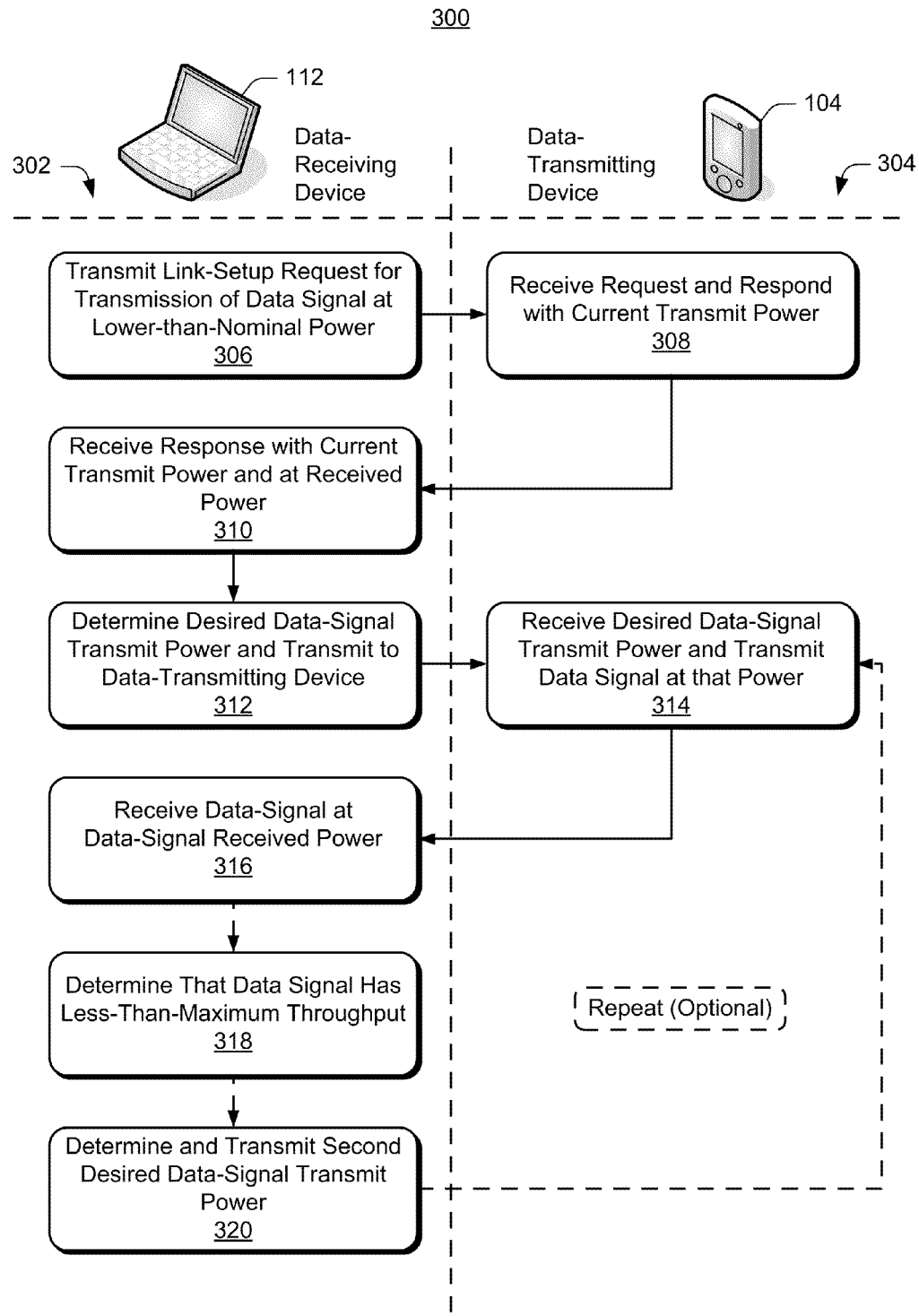
FIG. 3 is a method for controlling transmit-power of devices during short-range wireless communications.

FIG. 3 depicts a method 300 for controlling transmit-power control for short-range wireless communications. In this example implementation, a data-receiving device, here laptop computing device 112, is attempting to communicate wirelessly at short range with a data-transmitting device, here cellular phone 104. Note that these two devices are examples of device 102 of FIG. 1, and that both may include the elements shown for device 102 of FIG. 1 (e.g., communicator 120).

As illustrated, actions performed by a data-transmitting device are shown at 302 and actions of a data-receiving device are shown at 304, both separated by a vertical dashed line. The devices 104 and 112 shown are for illustration purposes, and are not intended to limit the types of data-transmitting and data-receiving devices. Note also that communications are made between both devices, and thus both transmit and receive. The data-transmitting device is the device that intends to transmit information over a wireless medium to the data-receiving device following link setup between the devices, described below.

At block 306, a data-receiving device transmits a link-setup request for a data-transmitting device to transmit at a lower-than-nominal power. The data-receiving device may transmit through various wireless local or personal area networks and using various protocols and modulations, such as those of the IEEE 802.11 family of protocols or the Bluetooth family of protocols to name a few. The data-receiving device may transmit the link-setup request using a different modulation or protocol than intended for future data communications. One such example is transmitting the link-setup request using robust modulation like direct sequence spread spectrum techniques (DSSS). Many of these robust modulations aid in setting up a communication link though they often have lower data throughput than the modulation used in future data transmissions. The link-setup request may also be sent at a lower-than-nominal power to reduce possible interference or saturation by the link-setup request.

At block 308, the data-transmitting device receives the link-setup request and responds with a link-setup response indicating a current transmit power of the data-transmitting device. In some cases the data-transmitting device also provides other information in the link-setup response, such as a link margin associated with the data-transmitting device. Link margin is a measure of the range of powers that the data-transmitting device may effectively demodulate a received signal.

At block 310, the data-receiving device receives the link-setup response from the data-transmitting device. This link-setup response indicates the current transmit power of the data-transmitting device at which the link-setup response was transmitted. This response is received at a particular power by the data-receiving device. With this information, the data-receiving device is able to determine a relationship between transmit power and received power. As noted in part above, the receiving device may also receive the link margin associated with the data-transmitting device.

At block 312, the data-receiving device determines a desired data-signal transmit power and transmits this desired data-signal transmit power to the data-transmitting device. This and other steps of this method may be performed by short-range wireless communicator 120, as well as wireless transmitter 116 and wireless receiver 118, all of which are shown in FIG. 1. Note that both the data-receiving device and the data-transmitting device may include these entities.

Short-range wireless communicator 120 determines the desired data-signal transmit power based on the transmit power at which the link-setup response was transmitted by the data-transmitting device, the received power of the link-setup response, and a desired data-signal reception power. As noted above the link-setup response indicated the transmit power and the data-receiving device determined the power at which link-setup response was received. Communicator 120 determines the desired data-signal transmission power with this information. In some cases communicator 120 also determines this based on the data-receiving device's link margin, hardware capabilities of wireless receiver 118, and/or the modulation that the data signal is intended to be transmitted.

In one implementation, communicator 120 determines the desired data-signal transmit power according to the following equation:

$$desiredtransmitPower = TPCresponseTxPower - RSSI_{Rx} + RSSI_{desiredRate}$$

Here desiredtransmitPower is the desired transmit power at which the data-receiving device requests that the data-transmitting device transmit the data signal. The TPCresponseTxPower is the current transmit power of the data-transmitting device. RSSI stands for "Received Signal Strength Indication". The $RSSI_{Rx}$ is the received power of the received response. The $RSSI_{desiredRate}$ is the desired received power. The desired power at which the data-signal is received is often based at least in part on the capabilities and configuration of the wireless receiver. Some wireless receivers receive data signals best at a particular power different from other wireless receivers, either independent of or based on the particular modulation of the data signal.

At block 314, the data-transmitting device receives the desired data-signal transmit power and transmits a data signal at the desired data-signal transmit power, which is received at the data-receiving device shown at block 316. At this point a link for communication is complete for data transmission based on the management transmissions communicated at blocks 306 through 312 and part of 314. In some cases, however, the data signal will be received by the data-receiving device having less than a maximum throughput for the modulation at which the data signal is sent. In such a case the method 300 proceeds along optional paths to blocks 318 and 320 as well as repeating some other actions of method 300.

As noted above, the data-receiving device at block 316 receives signals at a received power. Communicator 120 may then determine at block 318 that the received power has a less-than-maximum throughput for the modulation. Responsive to this determination and based on the received power of the data signal, communicator 120 determines a second desired data-signal transmit power at block 320. Communicator 120 may do so in a manner similar to the manner in which the first desired data-signal transmit power was determined.

One difference is that additional information has been gained, such as the received power of the data signal rather than the received power of a link-setup response. Responsive to determining this second desired data-signal transmit power, the data-receiving device transmits this second desired data-signal transmit power also at block 320. The data-transmitting device may use this information to transmit the data signal at the second desired data-signal transmit power at block 314. Note that these blocks may be repeated again if the data-receiving device determines that the received power is still at a less-than-maximum throughput.

Following the initial link setup, the data-receiving device, if it intends to adjust the transmission power of the data signal, may do so at block 320 using a directed probe response frame, such as those used in the IEEE 802.11 family of protocols.

This method may be responsive to either the data-receiving device, the data-transmitting device, or some third-party device determining that the nominal transmission power is potentially too high for maximum throughput between the data-receiving device and the data-transmitting device. One such case is when the data-receiving device determines that a data signal or setup signal from the data transmitting device is received at a power that does not permit a maximum throughput for the modulation of the signal. The data-receiving device may determine this through interference or saturation at its wireless receiver 118. It may also be determined by the data-transmitting device through delays or other information learned from communications from the data-receiving device or a third-party device.

The communication link established as part of method 300 can optionally be maintained, such as with closed-loop or open-loop control. Examples of open-loop control include ones that determine whether there has been a change in the received data-signal power and, responsive to this change, change a transmit power of the data-receiving device. Thus, communicator 120 may use an increase or decrease in received power of a data signal from the data-transmitting device to extrapolate that the data-receiving device will need to increase or decrease its transmission power in a similar manner. One case in which this occurs is when a device moves closer to or further away from the other device. In the example above a user may move the cellular phone 104 or the laptop computing device 112.

In more detail, communicator 120 may adjust transmission power of the data-receiving device or the data-transmitting device, depending on which device this particular communicator 120 resides in, using the following equation:

$$newtransmitPower = oldtransmitPower - oldRSSI + newRSSI$$

Here newtransmitPower is the new (second or later) desired transmit power at which the data-receiving device requests that the data-transmitting device transmits the data signal. The oldtransmitPower is the previous transmit power desired and requested. This is also the most-recent previous transmit power if the newtransmitPower is a third or later requested power. The oldRSSI is the previous (or in some cases average also) received power. The newRSSI is the current received power (or in some cases an average also).

Examples of closed-loop control include periodically re-performing some steps of the method 300 to determine a new desired data-signal transmit power or performing these steps responsive to determining a change in a throughput of a data signal. These steps include those performed at blocks 306, 310, and 312 and/or 318 and 320.

Lost Node

As noted in part above, in some cases a device that is transmitting a wireless signal may not be noticed by another device intending to transmit a signal. This signal from the other device may interfere with the signal of the unnoticed device (aka the "lost node"). This potential problem is exacerbated when a transmission is made at low power. To address this potential problem, the present specification describes techniques and apparatus that enable a device to determine that a low-power transmission will be made, which permit devices to effectively communicate at short range and often without interference by other devices.

Figure 4:
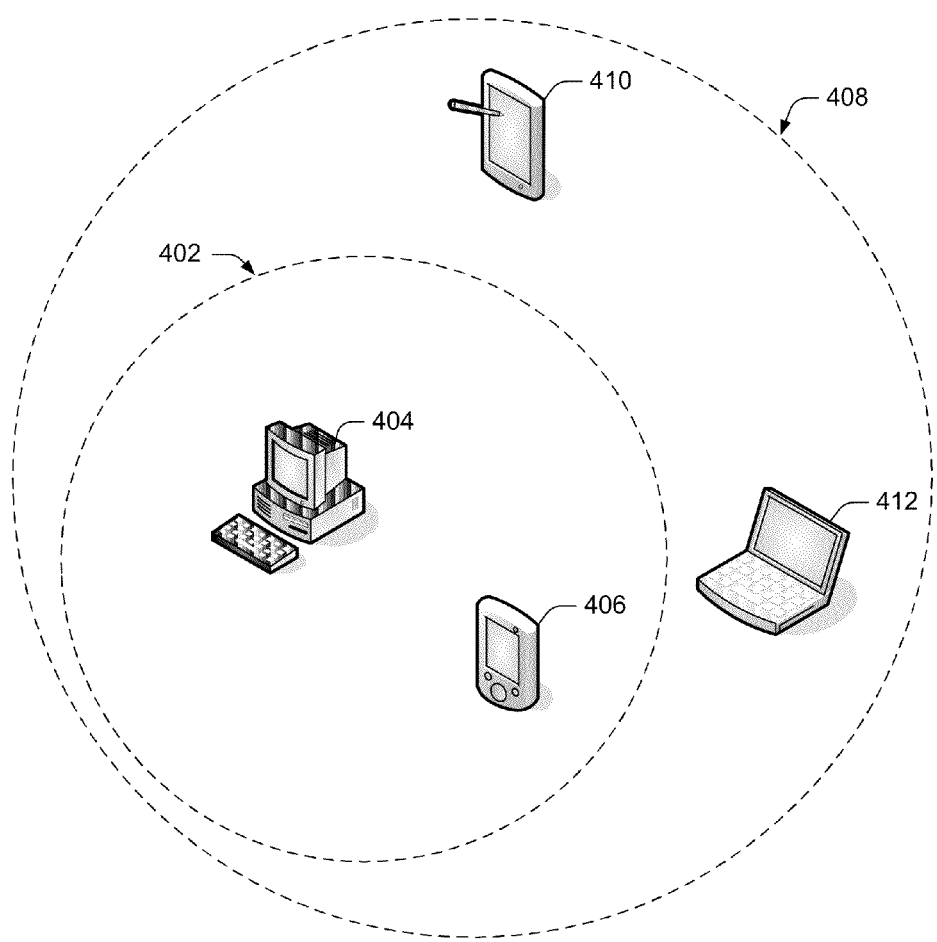
FIG. 4 illustrates example devices and transmission areas in which a lost-node problem can potentially occur in the context of low-power wireless communications.

FIG. 4 illustrates example devices and transmission areas in which a lost-node problem can potentially occur in the context of low-power transmission. Consider four examples of wireless-communication-capable devices 102 of FIG. 1. The first two devices are within a low-power transmission area 402. These two devices are low-power-area transmitting device 404 and low-power-area receiving device 406. The second two devices are within a higher-power transmission area 408. These two devices are higher-power-area transmitting device 410 and higher-power-area receiving device 412.

Note that area 402 overlaps with area 408. This overlap illustrates that a device in area 408 may potentially transmit a signal that interferes with signals in area 402. Such interferences are possible if a device in area 408 is not aware of low-power transmission in area 402.

The following discussion describes techniques to mitigate this and other interferences. These techniques may be implemented utilizing the previously described environment of FIGS. 1 and 4 as well as others. Aspects of these methods may be implemented in hardware, firmware, software, or a combination thereof. These methods are shown as a set of blocks that specify operations performed by one or more entities and are not necessarily limited to the orders shown for performing the operations by the respective blocks.

Figure 5:
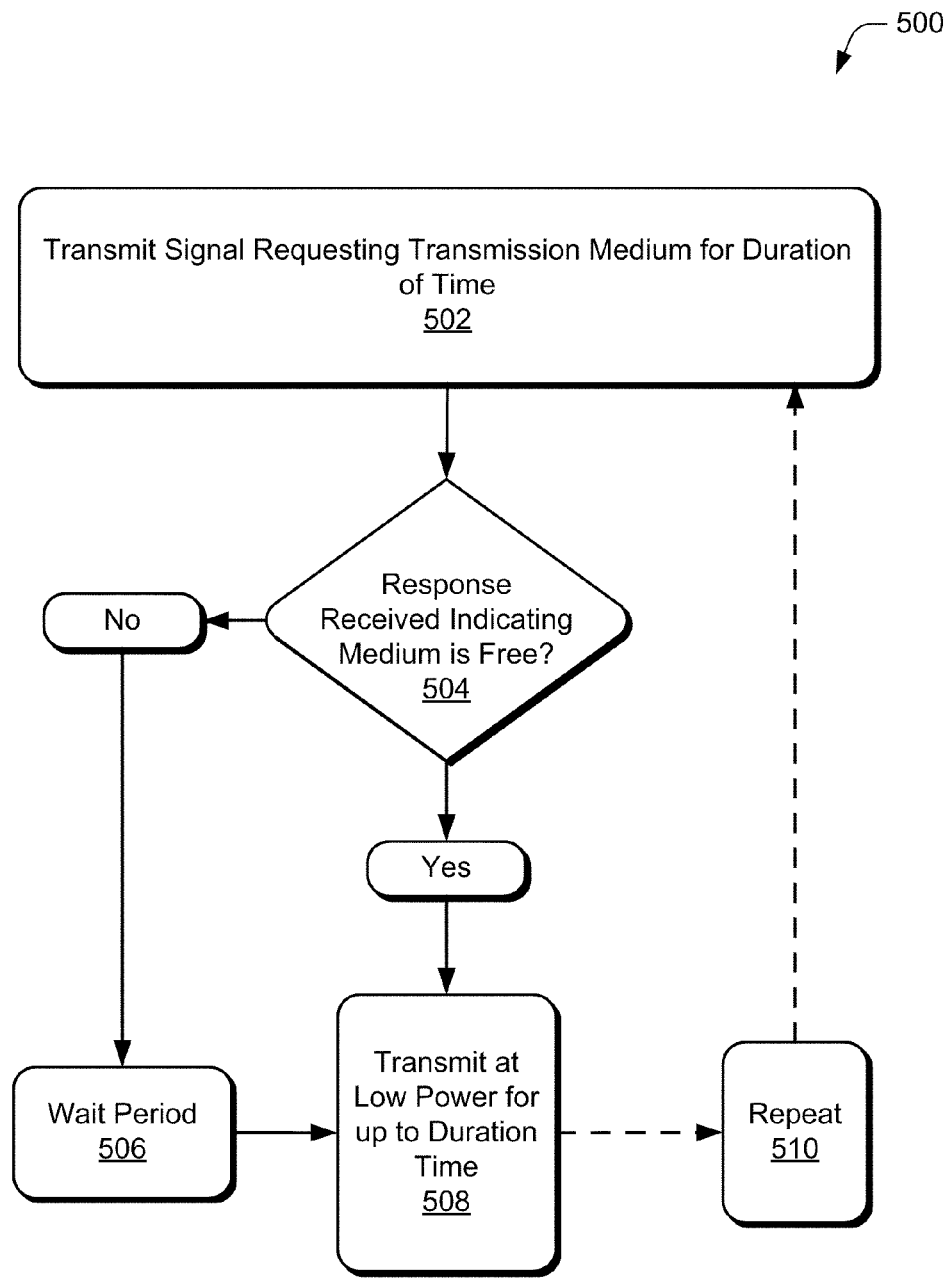
FIG. 5 is a method for addressing a potential lost-node problem.

FIG. 5 depicts a method 500 in an example implementation in which a device can address a potential lost-node problem. At block 502, a device intending to transmit at low power transmits a signal requesting a transmission medium for a duration of time. This signal may be sent having a robust modulation signal to increase the likelihood that a device (e.g., an Access Point or some device that may transmit) will receive and understand the transmission. The signal may also or instead be sent at a high or nominal power to increase the likelihood that a device that may not notice a future low-power signal will notice and understand this signal.

As noted in more detail below, communicator 120 may determine the duration of time based on how long the data will take to transmit using the medium and at a particular low power. This duration may be for a particular amount or all of the data. These particular amounts may be as little as some number of data packets that in total are not sufficient to transmit all of the desired data. This data can be as small as a single data packet, in which case the duration of time is short. In such a case the method 500 may be repeated for each packet, packets, or other particular amount of data.

Again consider FIG. 4. Here assume that cellular phone 406 intends to communicate at low power with desktop computing device 404, such as to sink up cellular phone 406's calendar with desktop computing device 404's calendar. Prior to doing so, cellular phone 406 (using communicator 120 and wireless transmitter 116 of FIG. 1) transmits a signal requesting a transmission medium so that the device can transmit a signal at low power. Here assume that cellular phone 406 transmits with wireless transmitter 116 and according to IEEE 802.11, with a robust modulation, and at nominal power. Examples of such a signal include a Request To Send (RTS) packet and a Clear To Send-Self (CTS-Self) packet.

At block 504, the transmitting device either receives a response from one or more third-party devices indicating that the requested medium is free to use or does not. If no response is received, the device proceeds along the "No" path to block 506. At block 506, the device waits some time period sufficient to indicate that no other devices received the request at block 504 or otherwise indicate that the medium is fee to use. After this wait period, the device proceeds to block 508.

At block 508 the device transmits at low power and for up to about the duration of time requested at block 504. If, however, the device receives a response indicating that the requested transmission medium is free to use, the device follows the "Yes" path to block 508 without a wait period. A response may include a Clear To Send (CTS) packet from other devices. Following the transmission at low power at block 508, the device may optionally proceed to block 510 to repeat the process. As noted in more detail below, the duration of time may be for a particular amount of data. If this amount of data is broken into pieces, or is small and discrete, such as a packet of data, then multiple pieces and multiple durations of time may be transmitted and requested.

Continuing the above example, assume that wireless receiver 118 of cellular phone 406 receives a signal from a device or access point (e.g., tablet computer 410) indicating that the other device or access point is granting the transmission medium. In some cases this signal in response to the request may be a CTS frame indicating that the medium is free to use. When sent from an access point, the response may indicate that the access point has set its NAV to not use the transmission medium for the duration of time. In any of these cases, communicator 120 receives this indication (demodulated by wireless receiver 118 and passed to communicator 120) and proceeds to block 508.

After receiving a response or waiting the period, cellular phone 406 transmits at low power (block 508). In this ongoing example, cellular phone 406's wireless receiver 118 receives the response indicating that the communication medium will not be used, after which communicator 120 permits cellular phone 406's wireless transmitter 116 to transmit at low power to desktop computing device 404 for the duration of time. If the duration is for a piece rather than all of the data, the device may repeat, following block 510, one or more parts of the method 500.

Note that the method of FIG. 5 may permit devices 404 and 406 to communicate at low power without interference from devices 410 and 412. Note also that this method may enable either or both of devices 410 and 412 to avoid interference from devices 404 and 406 as well, such as when a low-power transmission from cellular phone 406 may interfere with a transmission (high or low power) from tablet computer 410 that is intended for receipt by laptop computing device 412.

System-on-Chip Example

Figure 6:
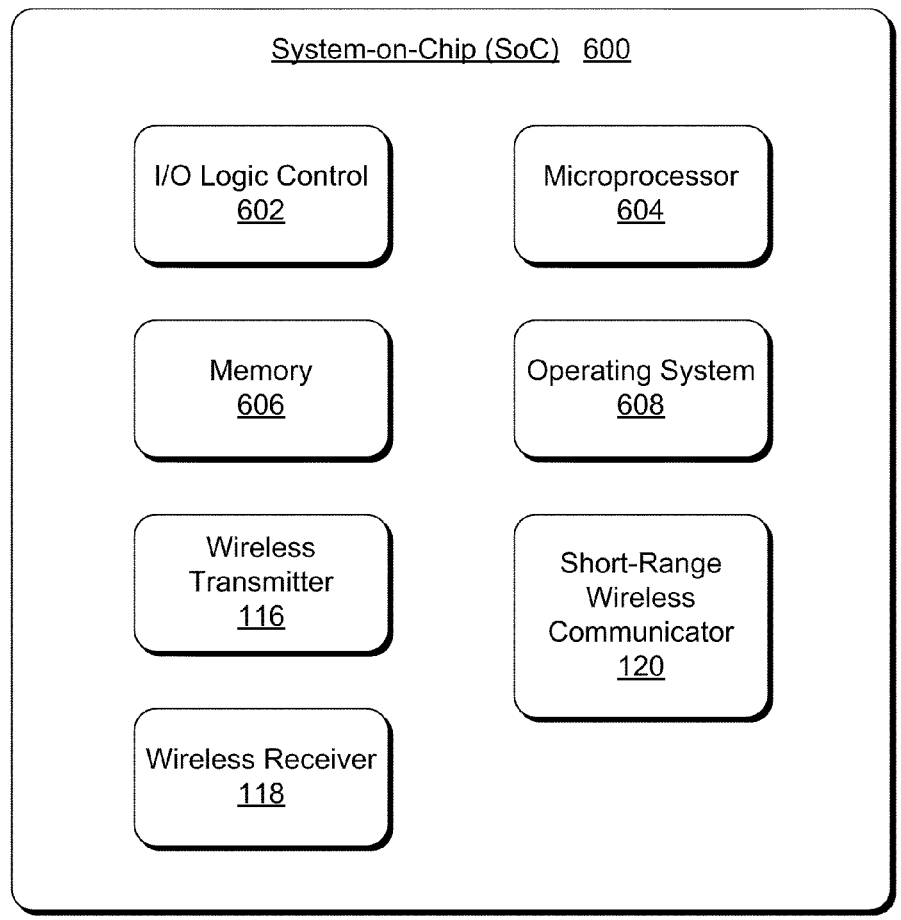
FIG. 6 illustrates an example system-on-chip (SoC) environment.

FIG. 6 illustrates an example System-on-Chip (SoC) 600, which can implement various embodiments described above. An SoC can be implemented in a fixed or mobile device, such as any one or combination of a media device, computer device, television set-top box, video processing and/or rendering device, appliance device, gaming device, electronic device, vehicle, workstation, and/or in any other type of device that may communicate wirelessly in a local or personal area network that may operate at short range. Examples of some of these are shown in FIG. 1 at 102.

SoC 600 can be integrated with electronic circuitry, a microprocessor, memory, input-output (I/O) logic control, communication interfaces and components, other hardware, firmware, and/or software needed to run an entire device. SoC 600 can also include an integrated data bus (not shown) that couples the various components of the SoC for data communication between the components. A device that includes SoC 600 can also be implemented with many combinations of differing components.

In this example, SoC 600 includes various components such as an input-output (I/O) logic control 602 (e.g., to include electronic circuitry) and a microprocessor 604 (e.g., any of a microcontroller or digital signal processor). SoC 600 also includes a memory 606, which can be any type of random access memory (RAM), a low-latency nonvolatile memory (e.g., flash memory), read only memory (ROM), and/or other suitable electronic data storage. SoC 600 can also include various firmware and/or software, such as an operating system 608, which can be computer-executable instructions maintained by memory 606 and executed by microprocessor 604. SoC 600 can also include other various communication interfaces and components, wireless LAN (WLAN) or PAN (WPAN) components, other hardware, firmware, and/or software.

SoC 600 may include wireless transmitter 116, wireless receiver 118, and short-range wireless communicator 120 (in either or multiple devices as noted above). Examples of these various components, functions, and/or entities, and their corresponding functionality, are described with reference to the respective components of the example environment 100 shown in FIG. 1.

Communicator 120 in SoC 600, either independently or in combination with other entities, can be implemented as computer-executable instructions maintained by memory 606 and executed by microprocessor 604 to implement various embodiments and/or features described herein. Short-range wireless communicator 120 may also be provided integral with other entities of the SoC, such as integrated with one or both of wireless transmitter 116 and wireless receiver 118. Alternatively or additionally, communicator 120 and the other components can be implemented as hardware, firmware, fixed logic circuitry, or any combination thereof that is implemented in connection with the I/O logic control 602 and/or other signal processing and control circuits of SoC 600.

This specification describes techniques and apparatus that enable short-range wireless communication by reducing the transmission power of a transmitting device. This enables a receiving device to demodulate the signal without being interfered with by a too-powerful transmitted signal. The techniques described herein also address "lost-node" problems that may arise in lower-power transmissions and in other cases where a node is not detected.

Although the subject matter has been described in language specific to structural features and/or methodological steps, it is to be understood that the subject matter defined in the appended claims is not necessarily limited to the specific features or steps described above, including orders in which they are performed.

What is claimed is:

1. A method for short-range wireless communication, the method comprising:
    transmitting, via a transmitter, a link-setup request through a network to a device, the link-setup request requesting a current transmit power of the device and transmitted at a lower-than-nominal power level of the transmitter effective to prevent saturation of a receiver of the device;
    receiving, via the receiver, a link-setup response through the network from the device, the link-setup response indicating the current transmit power of the device and having been received at a received power;
    determining, based on the received power of the link-setup response, a desired data-signal transmit power for the device; and
    transmitting, via the transmitter, the desired data-signal transmit power through the network to the device.

2. The method of claim 1, further comprising determining whether communication from the device is received at a power level that is too high for maximum throughput at a second device.

3. The method of claim 1, further comprising:
    receiving, via the receiver, a data signal through the network from the device, the data signal having a received data-signal power and having a modulation;
    determining whether the data signal has a less-than-maximum throughput for the modulation;
    determining, based on the received data-power signal and responsive to determining that the data signal has the less-than-maximum throughput, a second desired data-signal transmit power; and
    transmitting, via the transmitter, the second desired data-signal transmit power through the network to the device.

4. The method of claim 3, wherein transmitting the second desired data-signal transmit power to the device comprises using a directed probe response frame.

5. The method of claim 3, further comprising maintaining a communication link through which the data signal is communicated.

6. The method of claim 5, wherein maintaining a communication link comprises using open-loop control, the open-loop control being responsive to a change in a received data-signal power and, responsive to the change in the received data-signal power, changing a transmit power at which communications with the device are transmitted.

7. The method of claim 5, wherein maintaining a communication link comprises using closed-loop control, the closed-loop control comprising periodically re-performing the steps of the method for a new desired data-signal transmit power.

8. The method of claim 1, wherein transmitting the link-setup request and transmitting the desired data-signal transmit power are performed using a robust modulation.

9. The method of claim 8, wherein the robust modulation comprises a direct sequence spread spectrum technique.

10. The method of claim 1, wherein transmitting the desired data-signal transmit power to the device comprises transmitting at lower-than-nominal power level of the transmitter effective to prevent saturation of the receiver of the device.

11. The method of claim 1, wherein the network is a wireless local area network following a communication protocol within the IEEE 802.11 family of protocols.

12. The method of claim 1, wherein the network is a wireless personal area network following a communication protocol of within the Bluetooth family of protocols.

13. The method of claim 1, wherein determining a desired data-signal transmit power is further based on a link margin associated with a data-receiving device.

14. A method comprising:
    transmitting, from a first wireless-communication-capable device, a first signal at a first power and first modulation, the first signal indicating a request to use a wireless medium for a duration of time; and
    responsive to receiving a response indicating that the wireless medium is free to use for the duration of time or not receiving a response for a period sufficient to indicate that no potentially interfering device received the first signal, transmitting during the duration of time for which use of the wireless medium is requested, from the first wireless-transmission-capable device, a second signal at a second power, a second modulation, and for less than or equal to the duration of time, the second signal being different from the first signal and transmitting data to a second wireless-communication-capable device, the second power being a lower power than the first power, and the second modulation being different than the first modulation.

15. The method of claim 14, wherein the duration of time is based on an amount of time expected by the first wireless-communication-capable device to transmit a particular amount of data to the second wireless-communication-capable device using the second signal at the second power.

16. The method of claim 14, wherein the first power is a nominal power of the first wireless-communication-capable device and the second power is lower than the nominal power.

17. The method of claim 14, wherein the first signal comprises a Request To Send (RTS) packet or a Clear To Send-Self (CTS-Self) packet.

18. The method of claim 14, further comprising receiving the response indicating that the wireless medium is free to use, the response received at the first power and the first modulation and comprising a Clear To Send (CTS) frame.

19. A System-on-Chip (SoC) comprising:
  an interface to a wireless receiver configured to receive data via a wireless medium;
  an interface to a wireless transmitter configured to transmit data via the wireless medium; and
  a short-range communication module configured to:
    receive, via the receiver, a link-setup request, the link-setup request requesting transmission of a data signal at a lower-than-nominal power of the transmitter;
    transmit, via the transmitter and at the lower-than-nominal power level of the transmitter, a link-setup response in response to receiving the link-setup request, the link-setup response indicating a current transmit power of the transmitter;
    receive, via the receiver, a desired data-signal transmit power in response to the link-setup response;
    transmit, via the transmitter, a request to use the wireless medium for a duration of time; and
    transmit, via the transmitter and responsive to receiving an indication that the wireless medium is free to use for the duration of time or not receiving an indication for a period sufficient to indicate that no potentially interfering device received the request to use the wireless medium for the duration of time, the data signal at the desired data-signal transmit power for less than or equal to the duration of time.

* * * * *